US008980470B2

(12) United States Patent  (10) Patent No.: US 8,980,470 B2
Li et al.  (45) Date of Patent: Mar. 17, 2015

(54) LUG FOR LITHIUM ION BATTERY

(75) Inventors: Jian-Jun Li, Beijing (CN); Xiang-Ming He, Beijing (CN); Min Chen, Beijing (CN); Li-Juan Feng, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 115 days.

(21) Appl. No.: 13/089,494

(22) Filed: Apr. 19, 2011

(65) Prior Publication Data

US 2012/0015241 A1  Jan. 19, 2012

(30) Foreign Application Priority Data

Jul. 13, 2010 (CN) .......................... 2010 1 0224781

(51) Int. Cl.
*H01M 4/02* (2006.01)
*H01M 10/052* (2010.01)
*H01M 2/02* (2006.01)
*H01M 2/30* (2006.01)
*H01M 10/42* (2006.01)

(52) U.S. Cl.
CPC ............ *H01M 10/052* (2013.01); *H01M 2/021* (2013.01); *H01M 2/0212* (2013.01); *H01M 2/30* (2013.01); *H01M 10/42* (2013.01); *H01M 10/425* (2013.01); *Y02E 60/122* (2013.01)
USPC ................................ 429/211; 429/61; 429/62

(58) Field of Classification Search
None
See application file for complete search history.

(56) References Cited

U.S. PATENT DOCUMENTS

| 5,534,369 | A  | * | 7/1996  | Nagaura ........................ 429/161 |
| 5,858,533 | A  | * | 1/1999  | Greuter et al. ................. 428/404 |
| 6,235,426 | B1 | * | 5/2001  | Yanai et al. .................... 429/211 |
| 6,459,358 | B1 | * | 10/2002 | Shea et al. ....................... 338/20 |
| 2001/0018147 | A1 | * | 8/2001 | Yanai et al. ..................... 429/62 |
| 2004/0110061 | A1 |   | 6/2004 | Haug et al. |
| 2006/0008698 | A1 | * | 1/2006 | Kim et al. ........................ 429/48 |
| 2006/0127755 | A1 | * | 6/2006 | Cho ............................... 429/174 |

FOREIGN PATENT DOCUMENTS

| CN | 2599767 Y | 1/2004 |
| CN | 1523688 | 8/2004 |
| CN | 1905250 | 1/2007 |
| JP | 2004178914 | 6/2004 |

* cited by examiner

*Primary Examiner* — Milton I Cano
*Assistant Examiner* — Carmen Lyles-Irving
(74) *Attorney, Agent, or Firm* — Novak Druce Connolly Bove + Quigg LLP

(57) ABSTRACT

A lithium ion battery comprises a shell, a cell disposed in the shell, and two lugs connected to the cell. Each of the lugs comprises a conductive foil with a surface and a PTC layer disposed on the surface of the conductive foil. The lugs conduct currents between the lithium ion battery and an outer circuit.

14 Claims, 3 Drawing Sheets

LUG FOR LITHIUM ION BATTERY

BACKGROUND

1. Technical Field

The present disclosure relates to a lug, for a lithium ion battery, with a positive temperature coefficient (PTC) layer.

2. Description of Related Art

A lithium ion battery is normally provided with a battery protection device to prevent overcharging and over discharging. Such a battery protection device is generally unitized with the lithium ion battery as part of battery pack configuration, in which a circuit board that makes up the battery protection device is integrally contained in the pack case along with the lithium ion battery. It is common knowledge that battery packs such as this, are often used for battery-powered devices such as cell phones and laptops.

In addition to prevent overcharging and over discharging as mentioned above, this battery protection device can also have such functions as cutting off excessive current or monitoring cell temperature. If this device could be integrated with the lithium ion battery itself, it would be possible to create a lithium ion battery equipped with a battery protection device without constituting a battery pack, which would make the lithium ion battery more universally applicable.

When a battery protection device is integrated with a lithium ion battery, however, it is difficult to avoid making the external dimensions larger or losing the original configuration of the lithium ion battery. In particular, a flat-shaped lithium ion battery is made thin so that it can be used in small devices. Furthermore, when a battery protection device is integrated with such a lithium ion battery, it is difficult to find space for the circuit board that makes up the battery protection device. Thus, it is difficult to integrate a battery protection device without increasing the external dimensions.

Although the art has made strides toward minimizing the increase in the external dimensions of the lithium ion battery, there remains a need for a compact lithium ion battery that can be widely applied and safely operated.

BRIEF DESCRIPTION OF THE DRAWINGS

Many aspects of the disclosure can be better understood with reference to the drawings. The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
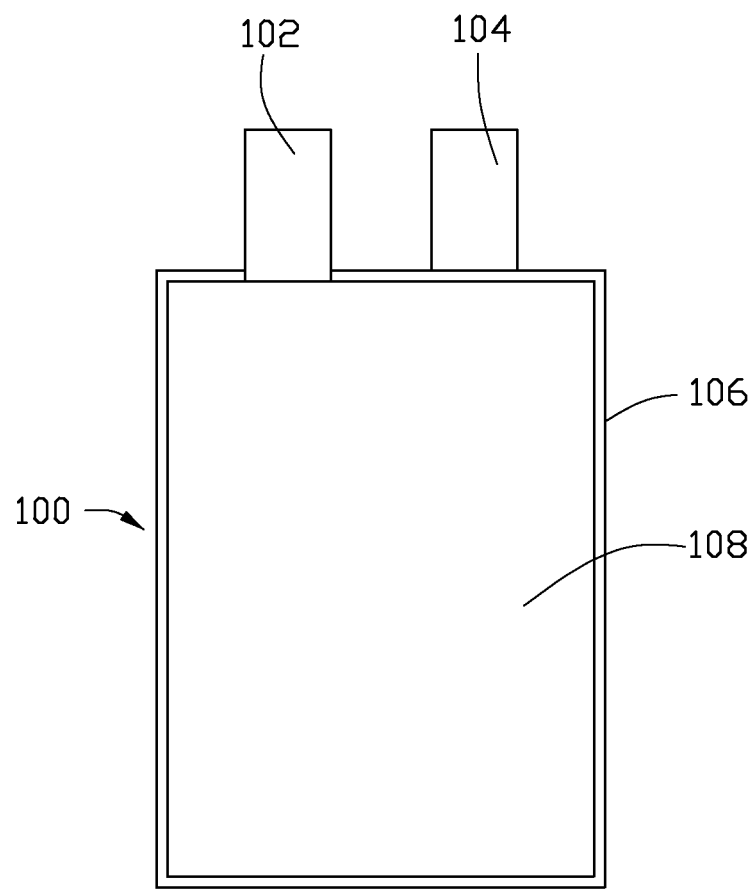
FIG. 1 is a schematic view of an embodiment of a lithium ion battery.

According to an embodiment, a lithium ion battery 100 as illustrated in FIG. 1 comprises a shell 106, a cell 108, and lugs 102 and 104. The cell 108 comprises a positive electrode current collector and a negative electrode current collector therein (not shown). The lugs 102 and 104 are a positive electrode lug 102 and a negative electrode lug 104. Each of the lugs 102 and 104 includes two ends.

One end of the positive electrode lug 102 is connected to the positive electrode current collector, and another end of the same protrudes out from the shell 106 and is electrically connected to an outer circuit (not shown). Likewise, one end of the negative electrode lug 104 is connected to the negative electrode current collector, and another end of the same protrudes out from the shell 106 and is electrically connected to the outer circuit. In other words, the lugs 102 and 104 are individually connected to the lithium ion battery 100 and the outer circuit in series. Thus, the lugs 102 and 104 conduct current between the lithium ion battery and the outer circuit.

In one embodiment, the positive electrode lug 102 and the negative electrode lug 104 are respectively connected to the positive and negative electrode current collectors by welding. However, in other embodiments, the positive electrode lug 102 and the negative electrode lug 104 can be respectively integrated with the positive and negative electrode current collectors. In addition, in one embodiment, there are one positive electrode lug 102 and one negative electrode lug 104 included in the lithium ion battery 100. However, in other embodiments, the number of the positive electrode lugs 102 and the negative electrode lugs 104 can be individually adjusted, or the lugs 102 and 104 can be integrated.

Figure 2:
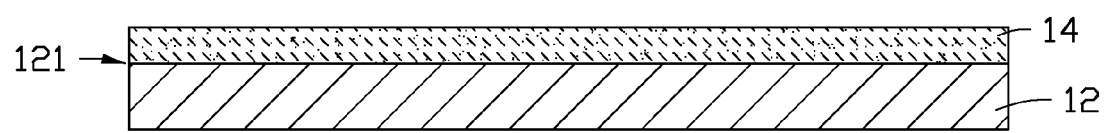
FIG. 2 is a cross-sectional view of a lug of the lithium ion battery shown in FIG. 1.

FIG. 2 is a cross-sectional view of a lug of the lithium ion battery 100 shown in FIG. 1. More specifically, in one embodiment, the positive electrode lug 102 is the lug shown in FIG. 2. However, in other embodiments, the negative electrode lug 104 or both of the lugs 102 and 104 could be the lug shown in FIG. 2. Referring to FIG. 2, the lug comprises a conductive foil 12 with a surface 121 and a PTC layer 14 disposed on the surface 121 of the conductive foil 12.

The conductive foil 12 can be gold, silver, copper, nickel, aluminum, pure metal with greater electric conductivity, or any combination thereof. Furthermore, a thickness of the conductive foil 12 is in a range from about 0.1 millimeter (mm) to about 0.4 mm, and a width of the same is in a range from about 3 mm to about 100 mm.

The PTC layer 14 can be a polymeric PCT composite or an inorganic oxide PTC composite. A thickness of the PTC layer 14 is in a range from about 5 micrometer (um) to about 500 um or in a range from about 5 um to about 50 um. The resistivity of the PTC layer 14 is in a range from about 0.005 ohm-centimeter ($\Omega \cdot cm$) to about 1 $\Omega \cdot cm$ in a normal atmospheric temperature, and the resistivity of the same is greater than $10^4$ $\Omega \cdot cm$ in a temperature exceeding 80° C. In addition, the PTC layer 14 is disposed on the surface 121 of the conductive foil 12 in FIG. 2. However, the PTC layer 14 could be disposed on two opposite surfaces of the conductive foil 12.

More specifically, the polymeric PCT composite comprises a number of conductive particles and a polymer with a melting point being in a range from about 80° C. to about 180° C. The conductive particles can be metal oxide, powdered metal, carbon particles, or any combination thereof. The polymer can be polyethylene, vinyl acetate, epoxy resin, or any combination thereof. Furthermore, the metal oxide can be vanadium trioxide ($V_2O_3$), vanadium oxide ($VO_2$), or Titanium dioxide ($TiO_2$). The powdered metal can be powdered silver, powdered copper, powdered nickel, or any combination thereof. The carbon particles can be made by graphite, carbon black, acetylene carbon black, carbon fiber, or carbon nanotubes.

Based on the foregoing, the conductive particles form conductive connections in the polymer such that the resistivity of the PTC layer 14 is lower in the normal atmospheric temperature. When the temperature is raised to the melting point of the polymer, the polymer expands to disconnect the conductive connections such that the resistivity of the PTC layer 14 is increased rapidly. Moreover, a mass ratio of the conductive particles to the polymer is in a range from about 0.2:1 to about 1:1, and a crystallinity of the polymer is in a range from about 10% to about 80%.

The inorganic oxide PTC composite can be $V_2O_3$, barium titanate ($BaTiO_3$), doped $V_2O_3$, doped $BaTiO_3$, or any combination thereof. More specifically, doped $V_2O_3$ and doped $BaTiO_3$ are respectively made by doping metal or material with a low-resistance phase into $V_2O_3$ and $BaTiO_3$. Thus, a resistivity of the $V_2O_3$ and $BaTiO_3$ can be lowered in a normal atmospheric temperature. The metal doped into $V_2O_3$ and $BaTiO_3$ can be lanthanum, antimony, yttrium, niobium, tantalum, or nickel.

In one example of the lithium ion battery 100, the conductive foil 12 of the positive electrode lug 102 is an aluminum foil, and the PTC layer of the same is $V_2O_3$. The negative electrode lug 104 is a nickel foil without a PTC layer. The aluminum foil of the positive electrode lug 102 is connected to the positive electrode current collector of the cell 108, and the PTC layer of the same is electrically connected to the outer circuit. The nickel foil of the negative electrode lug 104 is connected to the negative electrode current collector of the cell 108.

In an embodiment, a resistivity of the PTC layer of the positive electrode lug 102 is 0.08 Ω·cm without a short between the positive electrode lug 102 and the negative electrode lug 104. After a conductor shorts the positive electrode lug 102 and the negative electrode lug 104, the temperature of the lithium ion battery 100 is increased rapidly due to a short circuit. Consequently, the temperature of the PTC layer of the positive electrode lug 102 is increased. While the temperature of the PTC layer of the positive electrode lug 102 is exceeding 80° C., the resistivity of the PTC layer of the positive electrode lug 102 increases to $10^5$ Ω·cm. Afterward, the short circuit is broken to avoid the temperature of the lithium ion battery 100 increasing even still. Thus, the lithium ion battery 100 can be protected by the foregoing configuration.

Figure 3:
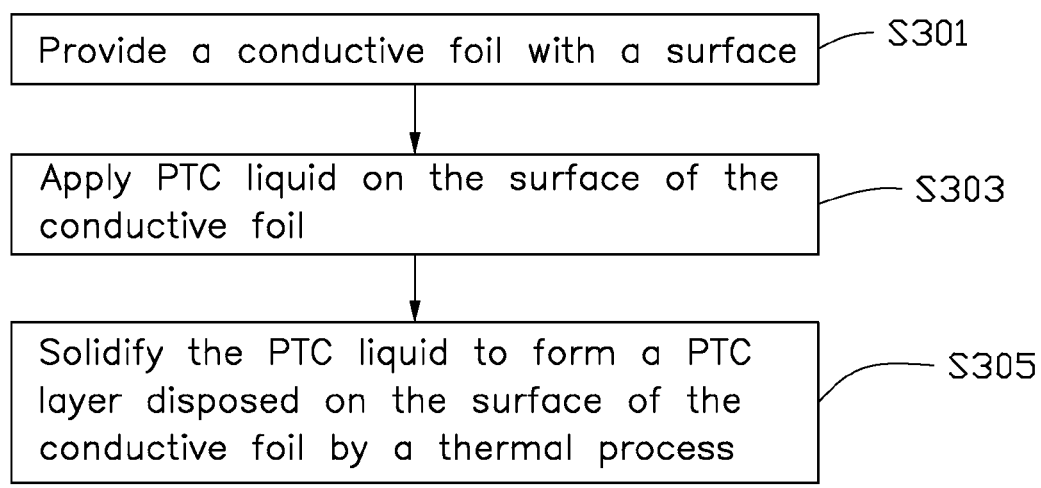
FIG. 3 is a flowchart of an exemplary method according to an embodiment for fabricating a lug of a lithium ion battery.

According to an embodiment, a method for fabricating a lug of a lithium ion battery is illustrated in FIG. 3. For exemplary purpose, the method is adapted for fabricating the lug of FIG. 2, and comprises the following steps. In step S301, a conductive foil 12 with a surface 121 is provided. Then in step S303, PTC liquid is applied on the surface 121 of the conductive foil 12. Finally, in step S305, the PTC liquid is solidified to form a PTC layer 14 disposed on the surface 121 of the conductive foil 12 by a thermal process.

The thermal process has a duration in a range of about 6 hours to about 10 hours, and a process temperature of the same is in a range from 70° C. to 120° C. When the PTC layer 14 is a polymeric PCT composite, the PTC liquid is composed of a number of conductive particles and a polymer. Furthermore, when the PTC layer 14 is an inorganic oxide PTC composite, conductive adhesive is added in the PTC liquid. The conductive adhesive can be polypyrrole, polythiophene, or polyaniline, while a weight percentage of the conductive adhesive is in a range from about 5% to about 10% in the PTC liquid.

In an example of the lug, the conductive foil 12 is an aluminum foil, and the PTC liquid is composed of $V_2O_3$ and epoxy resin. A volume ratio of the $V_2O_3$ to the epoxy resin is in a range of 0.9:1, and a crystallinity of the epoxy resin is 70%. When the thermal process lasts 8 hours and the process temperature of the same is 90° C., the PTC liquid is solidified to form the PTC layer 14 with a thickness of 50 um.

Alternatively, in another example of the lug, the conductive foil 12 is an aluminum foil, and the PTC liquid is composed of powdered $V_2O_3$ with a particle size being 40 um and polypyrrole, and a weight percentage of the polypyrrole is about 8% in the PTC liquid. When the thermal process lasts 8 hours and the process temperature of the same is 100° C., the PTC liquid is solidified to form the PTC layer 14 with a thickness of about 80 um.

Accordingly, current of a lithium ion battery can be broken when the lithium ion battery overheats due to an overcharge, a short, or other causes. In addition, a thin PTC layer can be located on a conductive foil. Thus, a compact lithium ion battery can be easily manufactured and safely operated.

Depending on the embodiment, certain of the steps of a method described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

It is to be understood that the above-described embodiments are intended to illustrate rather than limit the disclosure. Any elements described in accordance with any embodiments is understood that they can be used in addition or substituted in other embodiments. Embodiments can also be used together. Variations may be made to the embodiments without departing from the spirit of the disclosure. The above-described embodiments illustrate the scope of the disclosure but do not restrict the scope of the disclosure.

What is claimed is:

1. A lithium ion battery, comprising:
   a shell;
   a cell, comprising a positive electrode current collector and a negative electrode current collector, disposed in the shell; and
   at least one lug connected to the cell, comprising:
      a conductive foil having a first surface and an opposite second surface, and at least one side surface connecting the first surface to the second surface; and
      a PTC layer, disposed on one of the first surface and second surface of the conductive foil,
      wherein both of the first surface and second surface have a larger area than the at least one side surface of the conductive foil; and the conductive foil of the at least one lug is in direct contact with and electrically connected to the negative electrode current collector or the positive electrode current collector.

2. The lithium ion battery as claimed in claim 1, wherein the PTC layer of the at least one lug is electrically connected to an outer circuit.

3. The lithium ion battery as claimed in claim 1, wherein a resistivity of the PTC layer is in a range from 0.005 ohm-centimeter (Ω·cm) to 1 Ω·cm in a normal atmospheric temperature.

4. The lithium ion battery as claimed in claim 1, wherein the PTC layer is a polymeric PTC composite comprising a polymer and a plurality of conductive particles, and a crystallinity of the polymer is in a range from about 10% to about 80%.

5. A lithium ion battery, comprising:
   a circuit;
   a shell;

a cell comprising a positive electrode current collector and a negative electrode current collector, disposed in the shell; and at least one lug connected to the cell, comprising:

a conductive foil having a first surface and a second surface, and at least one side surface connecting the first surface to the second surface; and a PTC layer disposed on one of the first surface and the second surface of the conductive foil, wherein both of the first surface and second surface have a larger area than the at least one side surface of the conductive foil, the conductive foil of the at least one lug is in direct contact with and electrically connected to the negative electrode current collector or the positive electrode current collector, and the PTC layer is directly connected to the circuit.

6. The lithium ion battery as claimed in claim 5, wherein a resistivity of the PTC layer is in a range from 0.005 ohm-centimeter ($\Omega \cdot cm$) to 1 $\Omega \cdot cm$ in a normal atmospheric temperature.

7. The lithium ion battery as claimed in claim 5, wherein the PTC layer is a polymeric PTC composite comprising a polymer and a plurality of conductive particles, and a crystallinity of the polymer is in a range from about 10% to about 80%.

8. The lithium ion battery as claimed in claim 1, wherein the PTC layer is a polymeric PTC composite.

9. The lithium ion battery as claimed in claim 8, wherein the polymeric PTC composite is a polymer comprising a plurality of conductive particles.

10. The lithium ion battery as claimed in claim 9, wherein the plurality of conductive particles are selected from a group consisting of metal oxide, powdered metal, carbon particles, and any combination thereof.

11. The lithium ion battery as claimed in claim 9, wherein the polymer is selected from a group consisting of polyethylene, vinyl acetate, epoxy resin, and any combination thereof.

12. The lithium ion battery as claimed in claim 1, wherein the PTC layer is an inorganic oxide PTC composite.

13. The lithium ion battery as claimed in claim 12, wherein the inorganic oxide PTC composite is selected from a group consisting of vanadium trioxide ($V_2O_3$), barium titanate ($BaTiO_3$), doped $V_2O_3$, doped $BaTiO_3$, and any combination thereof.

14. The 1 lithium ion battery as claimed in claim 1, wherein a thickness of the PTC layer is in a range from 5 micrometers to 500 micrometers.

* * * * *